(12) United States Patent
Swanson et al.

(10) Patent No.: US 7,104,552 B2
(45) Date of Patent: Sep. 12, 2006

(54) PLASTIC BASKET SHOPPING CART

(76) Inventors: Terry Swanson, 2357 Warren Dr., Plattsmouth, NE (US) 68048; Larry Swanson, 2357 Warren Dr., Plattsmouth, NE (US) 68048

( * ) Notice: Subject to any disclaimer, the term of this patent is extended or adjusted under 35 U.S.C. 154(b) by 54 days.

(21) Appl. No.: 10/789,313

(22) Filed: Feb. 27, 2004

(65) Prior Publication Data

US 2005/0189731 A1     Sep. 1, 2005

(51) Int. Cl.
*B62B 3/18* (2006.01)

(52) U.S. Cl. ............................ 280/33.991; 280/33.993; 280/33.992; 280/DIG. 4; 280/642; 280/644

(58) Field of Classification Search .......... 280/33.991, 280/33.993, 33.992, DIG. 4, 642, 644
See application file for complete search history.

(56) References Cited

U.S. PATENT DOCUMENTS

| | | | | |
|---|---|---|---|---|
| 4,650,199 A | * | 3/1987 | Rehrig | 280/33.997 |
| 5,458,347 A | * | 10/1995 | Chiv | 280/33.992 |
| 5,865,448 A | * | 2/1999 | Kern et al. | 280/33.992 |
| 5,947,313 A | * | 9/1999 | Kern et al. | 220/4.01 |
| 6,672,599 B1 | * | 1/2004 | Thalhofer et al. | 280/33.998 |
| 6,676,139 B1 | * | 1/2004 | Saccani | 280/33.991 |
| 6,761,364 B1 | * | 7/2004 | Murar et al. | 280/33.991 |

* cited by examiner

*Primary Examiner*—Christopher P. Ellis
*Assistant Examiner*—Cynthia F. Collado
(74) *Attorney, Agent, or Firm*—Adam H. Jacobs

(57) ABSTRACT

An improved plastic basket shopping cart includes a cart base having an upwardly extending rear frame section with a handle and at least three wheels rotatably mounted on the cart base. A generally rectangular box shaped plastic basket is mounted on the cart base, and includes a base wall, left and right side walls and a front wall, the side walls and the front wall having a plurality of generally rectangular wall openings having a height greater than their width, excepting those wall openings adjacent the base wall being generally square in shape for improved structural strength. Rear flange sections extend outwards and rearwards from the side walls to substantially cover the gaps between the side walls and the rear frame section. Finally, a basket rim support wire extends circumferentially around and through upper portions of the side walls and front wall and connects to the rear frame section.

11 Claims, 4 Drawing Sheets

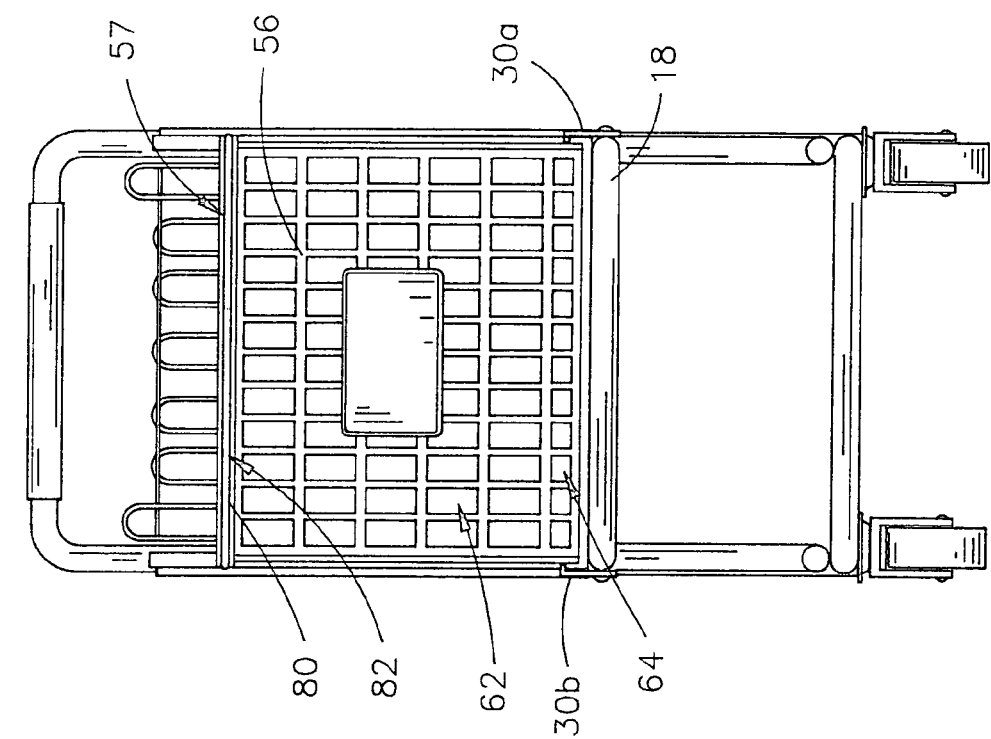
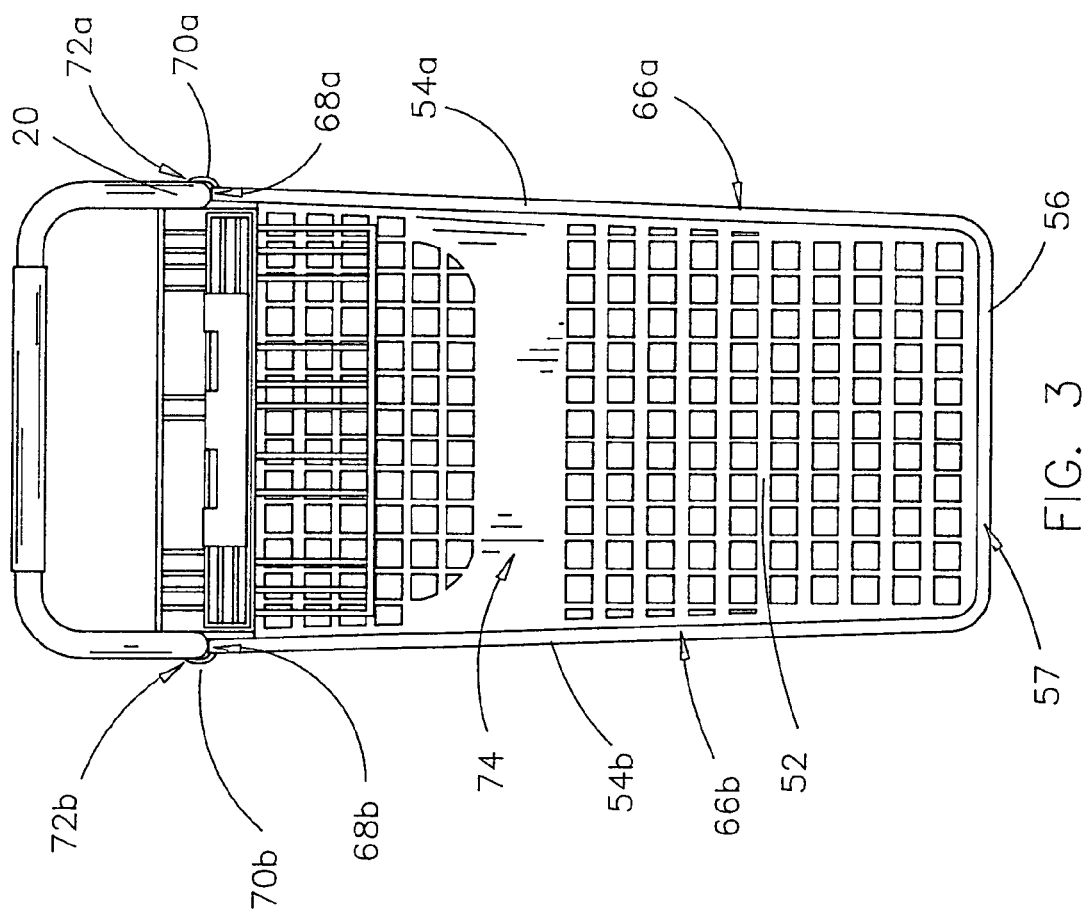

PLASTIC BASKET SHOPPING CART

BACKGROUND OF THE INVENTION

1. Technical Field

The present invention relates to shopping cart improvements and, more particularly, to a shopping cart having a plastic basket in which the plastic basket is a generally rectangular box having a base wall, left and right side walls and a front wall connecting the left and right side walls with the left and right side walls and front wall having a plurality of generally rectangular wall openings generally having a height greater than their width excepting at least some of the wall openings on the side walls and front wall adjacent the base wall being generally square in shape with approximately equal heights and widths, the left and right side walls also including rear flange sections which extend outwards and rearwards therefrom to at least partially cover an adjacent portion of the rear frame section of the shopping cart and finally the improved shopping cart would include a basket rim support wire extending circumferentially around and passing through upper portions of the left and right side walls and front wall, with the ends of the basket rim support wire connected to the rear frame section to increase the structural strength of the plastic basket as mounted on the rear frame section and cart frame.

2. Description of the Prior Art

Various types of molded plastic baskets and rear panels for shopping carts have been described in various prior art patents, for example, Badger, U.S. Pat. No. 4,632,411, Kern et al., U.S. Pat. No. 5,947,313 and Rehrig, U.S. Pat. Nos. 4,273,346 and 4,650,199. Each of these molded plastic baskets include various features which, at the time of patenting, were considered advanced in the field of plastic basket shopping cart design. However, the prior art still does not solve two of the major problems encountered in plastic basket design, and these are the structural integrity of the molded plastic basket and the connection of the molded plastic basket to the metal shopping cart frame on which it is mounted. There is therefore a need for an improved plastic basket shopping cart which addresses and generally solves these two prior art deficiencies.

Due to the loading and use characteristics of shopping cart baskets, the majority of stresses encountered by the plastic basket are encountered where the base wall of the basket connects with the side and front walls of the basket. The cited prior art baskets do not address the need for improved structural strength at these critical basket junctions, instead using the same grid or cris-cross formation all the way down to the base wall along the side and front walls. As the vast majority of flexing of the plastic basket walls takes place at the connection between the side walls and base wall and the front wall and base wall, it is critical that the location of the connections be structurally superior to other less critical areas of the plastic basket. There is therefore a need for an improved structural construction of the plastic basket to provide reinforcement of the connection between the side walls and base wall and front wall and base wall while still permitting the plastic basket to be molded as a single piece to keep the construction cost of the plastic basket as low as possible.

One of the other problems encountered with the plastic baskets of the prior art is that the connection of the plastic basket to the metal frame often leaves small gaps and spaces between the metal frame on which the basket is mounted and the basket itself. While in the majority of situations this does not present a problem, there are occasional times when items will fall from the basket or, more seriously, children's fingers or other extremities may become stuck between the basket and frame, and it is clear that either situation is undesirable. There is therefore a need for a basket construction which will generally eliminate the gaps between the plastic basket and the metal frame, particularly along the rear edges of the side walls and base wall to generally eliminate the loss of items stored within the cart and/or the catching of extremities in the gaps, particularly, the extremities of children.

Therefore an object of the present invention is to provide an improved plastic basket shopping cart.

Another object of the present invention is to provide an improved plastic basket shopping cart which includes a cart base having an upwardly extending rear frame section, at least three wheels rotatably mounted on the cart base, and a generally rectangular box shaped plastic basket mounted on the cart base, the plastic basket including a base wall, left and right side walls mounted on and extending upwards from the base wall and a front wall mounted on and extending upwards from the base wall and extending between and connecting forward portions of the left and right side walls.

Another object of the present invention is to provide an improved plastic basket shopping cart in which the left and right side walls and front wall include a plurality of generally rectangular wall openings extending through the walls, the wall openings generally having a height greater than their width, excepting the wall openings adjacent to the base wall which are generally square in shape with approximately equal heights and widths for improved structural strength of the connection between the left and right side walls and front wall and base wall.

Another object of the present invention is to provide and improved plastic basket shopping cart in which the left and right side walls each include generally cross-sectionally arcuate rear flange sections which extend outwards and rearwards therefrom, the rear flange sections at least partially covering an adjacent portion of the rear frame section to substantially prevent items in the plastic basket from falling out of the plastic basket through the gaps between the left and right side walls and the rear frame section.

Another object of the present invention is to provide an improved plastic basket shopping cart in which a basket rim support wire extends circumferentially around and passes through upper portions of the left and right side walls and front wall, the ends of the basket rim support wire connected to and mounted on the rear frame section adjacent an upper portion thereof for increased shopping cart structural strength and improved mounting of the plastic basket on the rear frame section.

Finally, an object of the present invention is to provide an improved plastic basket shopping cart which is relatively simple and inexpensive to manufacture and is safe, efficient and durable in use.

SUMMARY OF THE INVENTION

The present invention provides an improved plastic basket shopping cart including a cart base having an upwardly extending rear frame section having a handle mounted thereon and at least three wheels rotatably mounted on the cart base. A generally rectangular box-shaped plastic basket is mounted on the cart base, the plastic basket including a base wall, left and right side walls mounted on and extending upwards from the base wall and a front wall mounted on and extending upwards from the base wall and extending between and connecting forward portions of the left and right side walls. A rear wall is mounted on the rear frame section of the cart base for enclosing the interior of the basket. Each of the left and right side walls and the front wall include a plurality of generally rectangular wall openings extending through the left and right side walls and the front wall, the wall openings generally having a height greater than their width, except for at least some of the wall openings on the left and right side walls and the front wall which are adjacent the base wall which are generally square in shape with approximately equal heights and widths for improved structural strength. Each of the left and right side walls further include rear flange sections which extend outwards and rearwards therefrom, the rear flange sections each at least partially covering an adjacent portion of the rear frame section to substantially prevent items in the plastic basket from falling out of the plastic basket through a gap between the left and right side walls and the rear frame section. Finally, a basket rim support wire extends circumferentially around and through upper portions of the left and right side walls and the front wall, the ends of the basket rim support wire connected to and mounted on the rear frame section adjacent an upper portion thereof for increasing the structural strength of the plastic basket on the rear frame section.

The improved plastic basket shopping cart of the present invention as thus described provides many advantages of those devices found in the prior art. For example, because the connections between the left and right side walls and base wall and front wall and base wall are significantly strengthened, the useable life span of the shopping cart is extended and therefore the operating costs for the shopping cart are decreased as compared to those devices found in the prior art. Also, because the connection of the plastic basket to the metal frame significantly reduces and in many cases eliminates gaps between the metal frame and rear of the plastic basket, the loss of items from the cart interior is generally prevented and, possibly even more importantly, the opportunity for children to catch their extremities in the gaps of the shopping cart is greatly reduced. Furthermore, because the basket rim support wire extends circumferentially around and passes through upper portions of the left and right side walls and front wall, the structural strength of the entire shopping cart is increased, as the connection between the plastic basket and metal frame is greatly strengthened. Finally, because all these improvements are made without significantly modifying the construction methods used in connection with the plastic basket (i.e. injection molding), the improvements thus described are incorporated without significantly increasing the construction costs of the plastic basket of the present invention. The plastic basket shopping cart of the present invention thus provides a substantial improvement over those devices found in the prior art.

BRIEF DESCRIPTION OF THE DRAWINGS

FIG. 3 is a top plan view of the present invention;

FIG. 4 is a front elevational view of the present invention; and

DESCRIPTION OF THE PREFERRED EMBODIMENT

Figure 1:
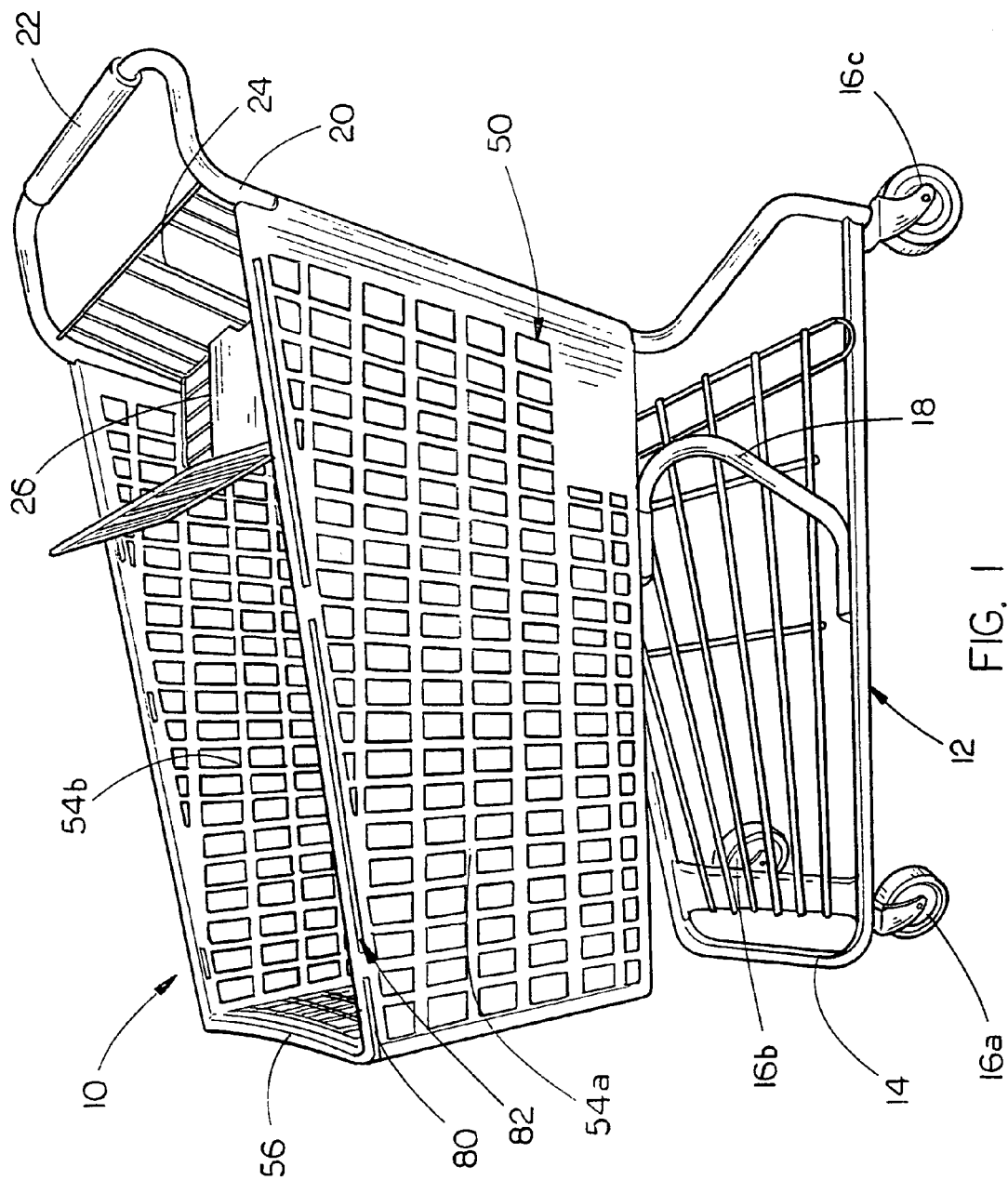
FIG. 1 is a perspective view of the improved plastic basket shopping cart of the present invention.

The improved plastic basket shopping cart 10 of the present invention is shown best in FIGS. 1–4 as including a metal cart frame 12 on which is mounted the improved plastic basket 50. It should be noted that the cart frame 12 of the present invention is generally similar to various types of frames constructed for shopping carts, and would include a generally trapezoidal base frame 14 on which are mounted a plurality of wheels 16a, 16b, 16c and 16d. Extending upwards from the base frame 14 is a center basket support strut 18 which is generally inverted U-shaped, and a rear frame section 20 which extends upwards from the base frame 14 and at the upper most portion thereof includes a cart handle portion 22, as shown best in FIGS. 1 and 2. In the preferred embodiment, cart base 14, center basket support strut 18 and rear frame section 20 would all be constructed of tubular metal bars constructed of steel or aluminum and it should be further noted that the exact size, shape and construction materials used in connection with the cart frame 12 are not critical to the present invention so long as the cart frame 12 properly supports the plastic basket 50 thereon. It is also expected that the improved plastic basket shopping cart 10 will include a rear wall 24 pivotably mounted on the rear frame section and a child seat/rear basket 26 mounted on the rear wall 24, substantially similar to those commonly found in conventional shopping carts, although it is not critical to include the child seat/rear basket 26 should such a modification be desired.

The plastic basket 50 of the present invention is shown best in FIGS. 1–4 as including a base wall 52, left and right side walls 54a and 54b and front wall 56, the entire plastic basket 50 being constructed via an injection molding process which produces a single molded plastic unit. It is preferred that each of the side walls 54a and 54b and front wall 56 be constructed as including a plurality of intersecting generally horizontal and generally vertical ribs 58 and 60 which are formed during the injection molding process and which therefore leave a plurality of wall openings 62, as shown best in FIGS. 1 and 2. In the preferred embodiment, each of the wall openings 62 starting from the top of each of the side walls 54a and 54b and front wall 56 would be generally rectangular in shape having a height greater than the width of the wall opening 62, excepting some of the topmost wall openings which are trapezoidal in shape due to the upwardly sloping angle of the top edges 66a and 66b of the side walls 54a and 54b. It has been found that the generally rectangular shape of wall opening 62 permits sufficient structural strength of the side walls 54a and 54b and front wall 56 while also conserving construction material, namely the plastic construction material used in connection with the plastic basket 50, thus keeping the cost of construction down while simultaneously providing sufficient structural strength for the plastic basket 50. However, it has also been found that the generally rectangular shape of the wall opening 62 should be modified adjacent the connection of side walls 54a and 54b to base wall 52 and front wall 56 to base wall 52, and therefore it is an important feature of the present invention that the wall openings 64 adjacent the base wall 52 in side walls 54a and 54b and front wall 56 be generally square in shape having approximately equal height and width, thereby increasing the structural strength and flexibility of the improved plastic basket of the present invention. The modification of the shape of the lowermost wall openings 64 is a unique aspect of the present invention and it has been found that the use of the differently dimensioned wall openings 64 has a significant impact on the structural strength of the plastic basket 50 itself.

The base wall 52 may further include a reinforced plate section 74 which provides additional support for the mounting of the center basket support strut 18 and therefore strengthens the entire shopping cart structure. This reinforced plate section 74 would preferably be formed during the manufacturing process and may be of many different sizes and shapes so long as the reinforced plate section 74 performs its intended function of providing additional support for the mounting of the center basket support strut 18.

Another important feature of the present invention is shown best in FIGS. 1, 2, 4 and 5 and is specifically found on the rear edges 68a and 68b of sidewalls 54a and 54b. Specifically, mounted on and extending outwards and rearwards from rear edges 68a and 68b of side walls 54a and 54b are a pair of rear frame section engaging flanges 70a and 70b which are generally semi-cylindrical in shape, having an arcuate cross-sectional shape, and extend rearwards over and around the rear frame section 20, specifically the upwardly extending portions of rear frame section 20 shown best in FIGS. 1 and 2. As shown in the drawings, flanges 70a and 70b extend from the base wall 52 upwards to adjacent top edge 66a and 66b of side walls 54a and 54b to generally close the gap between rear edges 68a and 68b of sidewalls 54a and 54b and rear frame section 20, a gap which is responsible not only for the loss of smaller materials therethrough but also is responsible in those devices found in the prior art for catching the extremities of small children therein which can potentially cause injury to the child, a highly undesirable feature of the prior art.

It should be noted that the curvature of flanges 70a and 70b around rear frame section 20 is significant for an additional reason in that the rear frame extensions found in some devices in the prior art are liable to be broken off through incidental contact of the rearwardly projecting flange with external elements, but the curvature of the flanges 70a and 70b of the present invention remove the rearward edge 72a and 72b of flanges 70a and 70b from the area most likely to be impacted by external elements, namely the left and right outer faces of the rear frame section 20. This then makes it unlikely that the flanges 70a and 70b would be broken off because of their curvature, as opposed to the various rearwardly projecting basket extensions of shopping carts in the prior art. This flange curvature is an important and unique element of the present invention.

Figure 2:
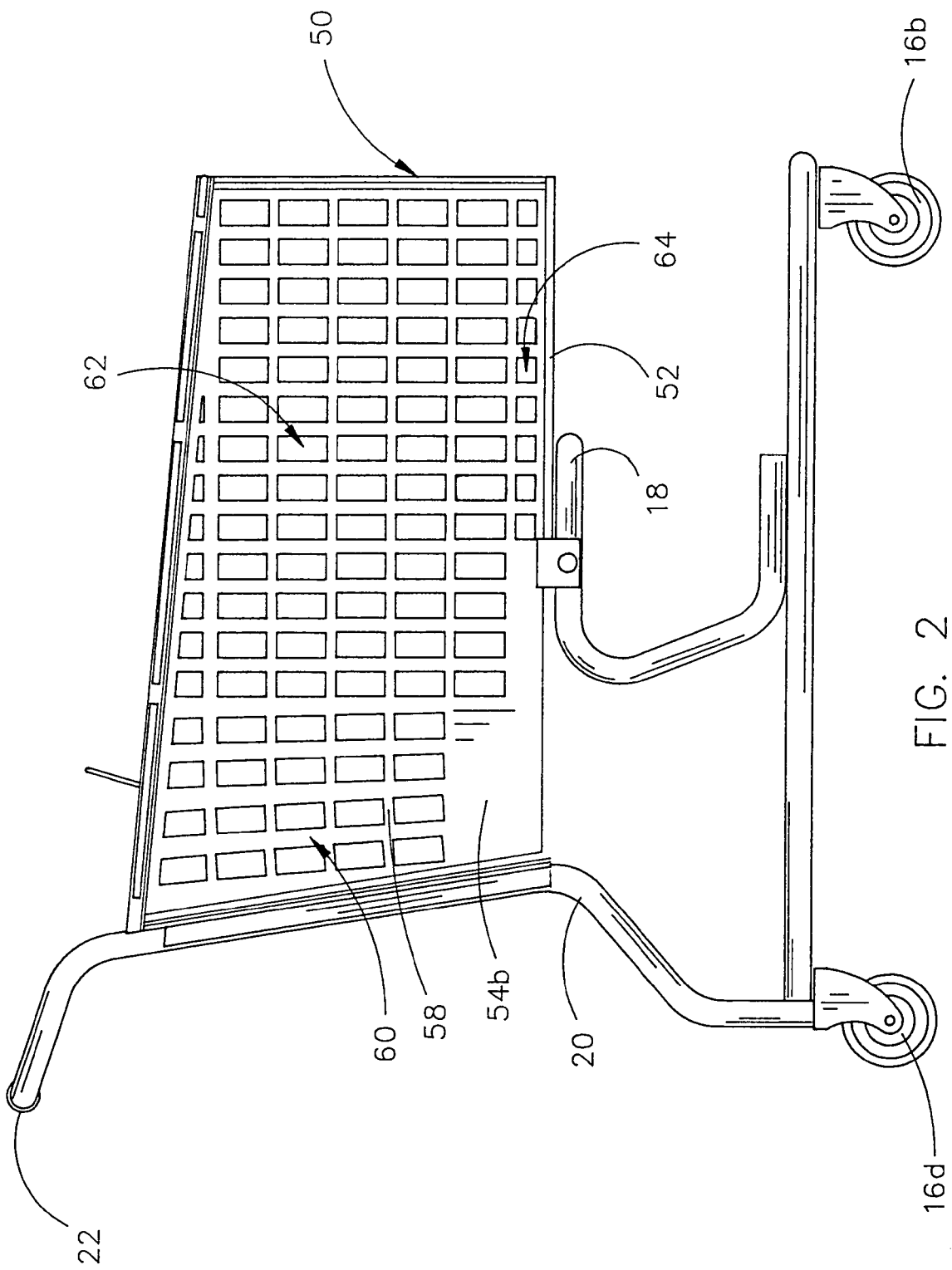
FIG. 2 is a side elevational view of the improved plastic basket shopping cart of the present invention.
Figure 5:
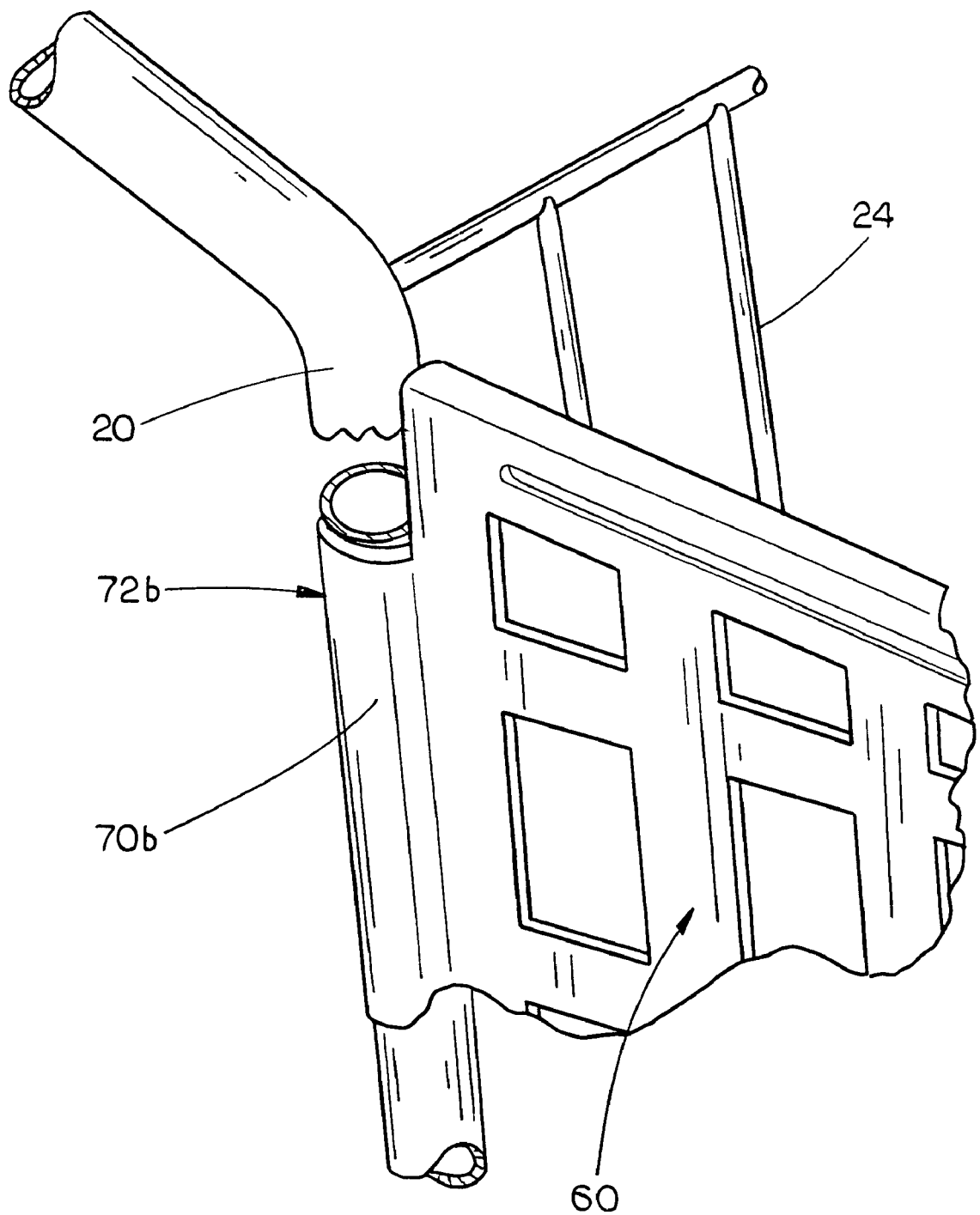
FIG. 5 is a detail perspective view of the rear flange of one side wall of the present invention.

Another important element of the present invention is that the plastic basket 50 is mounted to the cart frame 12 at three locations, specifically by a pair of L-shaped brackets 30a and 30b which connect the plastic basket 50 to the center basket support structure 18, the connection of the rear edges 68a and 68b of side walls 54a and 54b which are preferably riveted to rear frame section 20 generally adjacent the base wall 52 and finally and perhaps most importantly, a basket rim support wire 80 which extends circumferentially around and passes through upper portions of side walls 54a and 54b and front wall 56 as shown best in FIGS. 1 and 2, the basket rim support wire 80 then being connected at the ends thereof to the rear frame section 20 to securely and safely mount the plastic basket 50 on the cart frame 12. The basket rim support wire 80 is preferably a metal wire or tube which extends adjacent the top edges 66a and 66b of side walls 54a and 54b and the top edge 57 of front wall 56 and would be housed within a channel 82 which extends circumferentially around the upper portion of plastic basket 50 on side walls 54a and 54b and front wall 56. The channel 82 would preferably be formed integrally with the side walls 54a and 54b and front wall 56 in order to provide additional structural stability to the plastic basket 50 and once the basket rim support wire 80 is extended through channel 82 and connected to rear frame section 20 via appropriate fastening devices, the plastic basket 50 is securely and safely mounted on the cart base frame 12 to form the plastic basket shopping cart 10 of the present invention.

It is to be understood that numerous additions, modifications, and substitutions may be made to the improved plastic basket shopping cart 10 of the present invention which fall within the intended broad scope of the appended claims. For example, the precise size, shape and construction materials used in connection with the present invention are generally not critical to the present invention, excepting that the plastic basket 50 should be constructed of a molded plastic material in order to take full advantage of the durability properties of that construction material. Also, the exact size and shape and number of wall openings 62 and square wall openings 64 is not critical to the present invention so long as the square wall openings 64 are formed adjacent base wall 52 in side walls 54a and 54b and front wall 56 to increase the structural stability of the plastic basket 50. Finally, the exact nature of the flanges 70a and 70b and basket rim support wire 80 may be modified or changed so long as the intended functional characteristics of the flanges 70a and 70b and basket rim support wire 80 are maintained, specifically that the flanges 70a and 70b curve at least partially around the rear frame section 20 and the basket rim support wire 80 supports and strengthens the connection of the plastic basket 50 to the rear frame section 20 and provides additional structural strength for the plastic basket 50 itself.

There has therefore been shown and described an improved plastic basket shopping cart 10 which accomplishes at least all of its intended objectives.

We claim:

1. An improved plastic basket shopping cart comprising:
  a cart base frame having an upwardly extending rear frame section having handle means mounted thereon;
  at least three wheels rotatably mounted on said cart base frame;
  a plastic basket mounted on said cart base frame, said plastic basket including;
  a base wall, left and right side walls mounted on and extending upwards from said base wall and a front wall mounted on and extending upwards from said base wall and extending between and connecting forward portions of said left and right side walls;
  each of said left and right side walls and said front wall having a plurality of generally rectangular wall openings extending through said left and right side walls and said front wall, said wall openings generally having a height greater than their width;
  at least some of said wall openings on said left and right side walls and said front wall adjacent said base wall being generally square in shape with approximately equal heights and widths for improved structural strength;
  each of said left and right side walls of said plastic basket including generally cross-sectionally arcuate rear flange sections mounted on and extending outwards and rearwards therefrom, said rear flange sections each at least partially covering an adjacent portion of said rear frame section to substantially cover and close the gap between each of said left and right side walls and said adjacent portion of said rear frame section thereby substantially preventing items in said plastic basket from falling out of said plastic basket through a gap between said left and right side walls and said rear frame section; and a basket rim support wire extending circumferentially around and passing through upper portions of said left and right side walls and said front wall, the ends of said basket rim support wire connected to and mounted on said rear frame section adjacent an upper portion thereof for increasing the structural strength of said plastic basket on said rear frame section of said cart base frame.

2. The improved plastic basket shopping cart of claim 1 wherein said cart base frame further includes an upwardly extending center basket support strut which engages said base wall, said base wall further including a reinforced plate section operative to provide additional structural support for the connection of said center basket support strut thereto thus strengthening said improved plastic basket shopping cart.

3. The improved plastic basket shopping cart of claim 1 further comprising a rear wall mounted on said rear frame section of said cart base.

4. The improved plastic basket shopping cart of claim 1 wherein said generally cross-sectionally arcuate rear flange sections have cross-sectional curvatures approximately equal to the curvature of said adjacent portions of said rear frame section such that said rear flange sections are generally continuously adjacent said adjacent portions of said rear frame section.

5. The improved plastic basket shopping cart of claim 1 wherein each of said left and right side walls and said front wall include a plurality of intersecting generally horizontal and generally vertical ribs, said generally vertical ribs extending to adjacent the top edges of each of said left and right side walls and said front wall, said generally horizontal ribs on each of said left and right side walls extending to adjacent said front wall.

6. The improved plastic basket shopping cart of claim 1 further comprising a channel formed in said upper portions of said left and right side walls and said front wall, said channel adapted to receive said basket rim support wire extending circumferentially around and passing through said upper portions of said left and right side walls and said front wall within said channel in order to provide additional structural stability to said plastic basket.

7. An improved plastic basket shopping cart comprising:
a cart base frame having an upwardly extending center basket support strut, an upwardly extending rear frame section having handle means mounted thereon;
at least three wheels rotatably mounted on said cart base frame;
a plastic basket mounted on said cart base frame, said plastic basket including;
a base wall, left and right side walls mounted on and extending upwards from said base wall and a front wall mounted on and extending upwards from said base wall and extending between and connecting forward portions of said left and right side walls;
said upwardly extending center basket support strut engaging and supporting said base wall, said base wall further including a reinforced plate section operative to provide additional structural support for the connection of said center basket support strut thereto;

each of said left and right side walls and said front wall having a plurality of wall openings extending through said left and right side walls and said front wall, said wall openings generally having a height greater than their width;

at least some of said wall openings on said left and right side walls and said front wall adjacent said base wall having approximately equal heights and widths for improved structural strength;

each of said left and right side walls of said plastic basket including generally cross-sectionally arcuate rear flange sections mounted on and extending outwards and rearwards therefrom, said rear flange sections each at least partially covering an adjacent portion of said rear frame section to substantially cover and close the gap between each of said left and right side walls and said adjacent portion of said rear frame section thereby substantially preventing items in said plastic basket from falling out of said plastic basket through a gap between said left and right side walls and said rear frame section; and a basket rim support wire extending circumferentially around and passing through upper portions of said left and right side walls and said front wall, the ends of said basket rim support wire connected to and mounted on said rear frame section adjacent an upper portion thereof for increasing the structural strength of said plastic basket on said rear frame section of said cart base frame.

8. The improved plastic basket shopping cart of claim 7 further comprising a rear wall mounted on said rear frame section of said cart base.

9. The improved plastic basket shopping cart of claim 7 wherein said generally cross-sectionally arcuate rear flange sections have cross-sectional curvatures approximately equal to the curvature of said adjacent portions of said rear frame section such that said rear flange sections are generally continuously adjacent said adjacent portions of said rear frame section.

10. The improved plastic basket shopping cart of claim 7 wherein each of said left and right side walls and said front wall include a plurality of intersecting generally horizontal and generally vertical ribs, said generally vertical ribs extending to adjacent the top edges of each of said left and right side walls and said front wall, said generally horizontal ribs on each of said left and right side walls extending to adjacent said front wall.

11. The improved plastic basket shopping cart of claim 7 further comprising a channel formed in said upper portions of said left and right side walls and said front wall, said channel adapted to receive said basket rim support wire extending circumferentially around and passing through said upper portions of said left and right side walls and said front wall within said channel in order to provide additional structural stability to said plastic basket.

* * * * *